Feb. 16, 1960     R. C. LINDBERG     2,925,167
CONVEYOR FOR ARTICLES IN IMBRICATING RELATIONSHIP
Filed Feb. 3, 1958
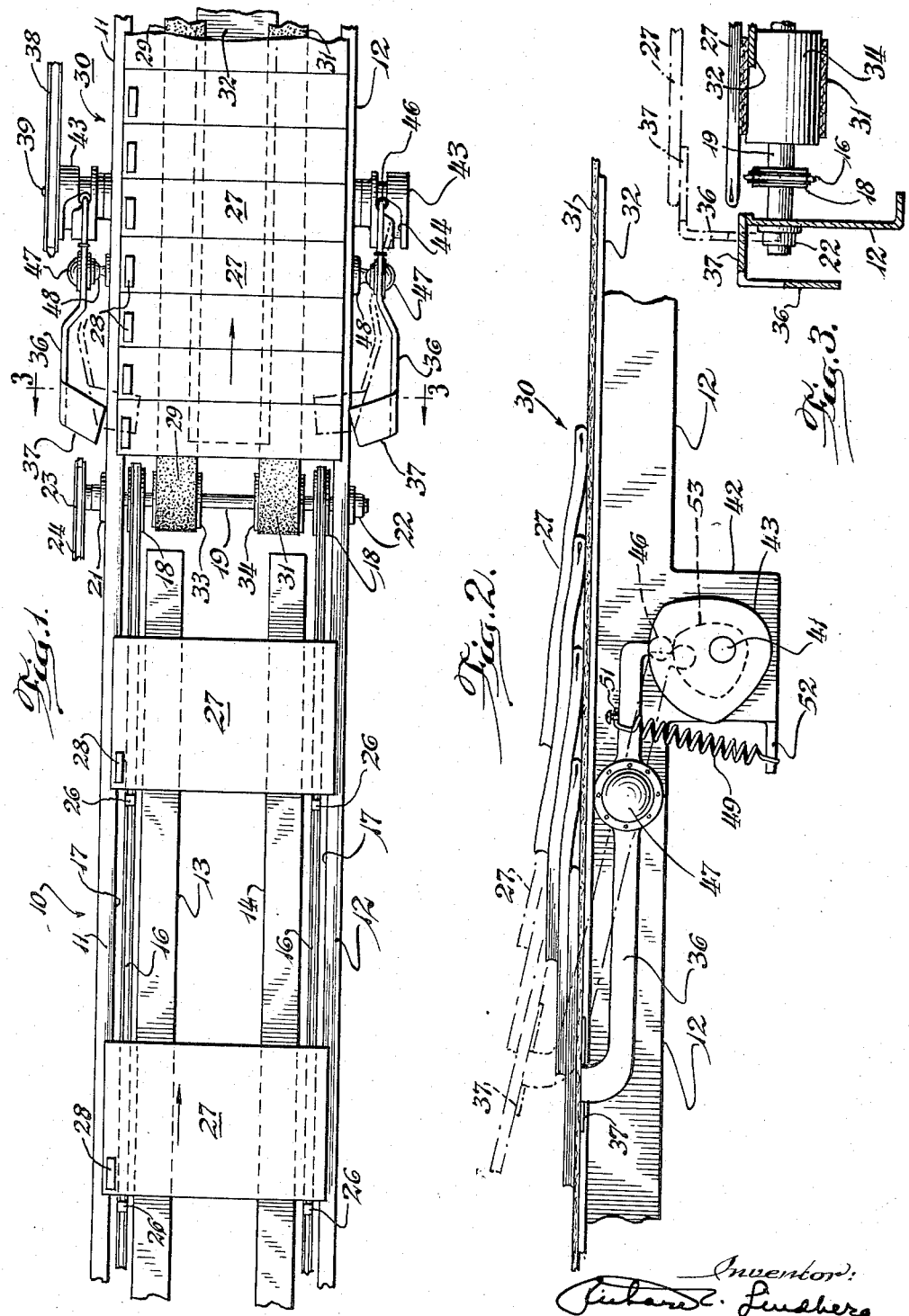

United States Patent Office 2,925,167
Patented Feb. 16, 1960

2,925,167
CONVEYOR FOR ARTICLES IN IMBRICATING RELATIONSHIP

Richard C. Lindberg, Skokie, Ill., assignor to Cheshire, Incorporated, Chicago, Ill., a corporation of Illinois Application February 3, 1958, Serial No. 713,062

10 Claims. (Cl. 198—35)

This invention relates generally to conveyors and more particularly to improvements in conveyors where articles are moved on a first conveyor in spaced relationship and then on a second conveyor in underlying imbricating relationship.

The invention is particularly adaptable for use with mailing machines of the type as disclosed in Ridenour Pat. No. 2,606,681, for Machine for Applying Address Labels where flat articles such as magazines are conveyed past a mailing head for application thereto of an address label. The present invention makes it possible to move the addressed magazines in such a fashion that the address labels are visible to the mailing room operator, instead of being covered up. Moreover, the addressed magazines move on a conveyor in underlapping imbricating relationship at a low speed as compared to that at which they are addressed. This makes it possible for the mailer readily to read each label and to separate same according to town groups or otherwise as desired.

Apparatus according to the present invention consists of a pair of conveyors, one moving at a speed but a fraction of the other conveyor, the articles delivered from the other conveyor moving beneath the last delivered articles on the slower moving conveyor, the trailing edges of the last such delivered articles being lifted so that an article delivered from the other conveyor can be moved beneath the articles moving on the slower conveyor in imbricating relationship.

With the foregoing considerations in mind, it is a principal object of this invention to move articles in spaced relationship upon a faster moving conveyor and then move the same upon a slower moving conveyor with the articles in underlying imbricating relationship.

Another object is to provide a conveyor for a mailing machine to apply address labels to moving mailing pieces, and thereafter to convey such mailing pieces in an underlying imbricating relationship so that the mailing addresses will be apparent to an operator stationed at the second slower moving conveyor.

Still another object is to provide apparatus for lifting the trailing edges of articles moving in underlying imbricating relationship upon a relatively slow moving conveyor, so that articles delivered from a faster conveyor can be delivered beneath the last article delivered to the slower moving conveyor, such delivered article then moving with all the other articles moving upon the slower moving conveyor.

Other objects and important features of the invention will be apparent from the study of the specification following taken with the drawing which together describe and illustrate a preferred embodiment of the invention and what is now considered to be the best mode of practicing the principles thereof. Other embodiments may be suggested to those having the benefit of the teachings herein, and such other embodiments are intended to be reserved especially as they fall within the scope and spirit of the subjoined claims.

In the drawing:

Fig. 1 is a plan view of an improved conveyor for a mailing machine or the like, said conveyor having the improvements according to the present invention embodied therein;

Fig. 2 is a side elevation view of a portion thereof, to a larger scale than that seem in Fig. 1; and Fig. 3 is a vertical section taken along the line 3—3 of Fig. 1 looking in the direction of the arrows.

Referring now to Fig. 1, the improvements according to the present invention are embodied in a conveyor for mailing machines or the like referred to generally by the reference numeral 10. Such a conveyor includes side frame members 11 each spaced a slight amount from its respective frame members 11 and 12 and a bed consisting of flat plate members 13 and 14. A pair of conveyor chains 16, 16 move in slots 17 between the frame member 11 and flat plate member 13 and between frame member 12 and flat plate member 14, each chain 16 being reeved about a drive sprocket 18 fast upon a drive shaft 19. The shaft 19 turns in pillow blocks 21 and 22 supported respectively on the frame members 11 and 12, and the shaft 19 has a sprocket 23 fast thereto driven by a sprocket chain 24.

Each conveyor chain 16 has spaced lugs 26 thereon arranged to engage the trailing edge of a mailing piece 27. Each mailing piece has applied thereto an address label 28 as it moves past a mailing head, not shown, of the type as shown in the aforesaid Ridenour patent. The shaft 19 for driving the conveyor chain 16 is driven in synchronism with the operation of the mailing head which applies the address labels 28 to the mailing pieces 27.

The addressed mailing pieces 27 are delivered to a second conveyor 30 consisting of spaced endless belts 29 and 31 which are guided on a support plate 32 extending longitudinally therebetween. The belts 29 and 31 are reeved about idler pulleys 33 and 34, free to turn upon the shaft 19, the said belts being driven at the discharge end of the conveyor 30 by any suitable driving means not shown. The speed of conveyor 30 is less than that of the speed of the conveyor chains 16, 16, so that the articles 27 can move on conveyor 30 in underlying imbricating relationship. For example, the ratio of the speeds of the two conveyors is such that but little more than the address label 28 is visible when the articles are moving on the slower moving conveyor 30.

Means are provided for lifting the trailing edge of the articles last previously delivered to the conveyor 30 so that the articles 27 being transferred by the conveyor chains 16, 16 thereto can move beneath the lifted trailing edge, then to assume the speed of the slower moving conveyor 30. Such means includes a pair of arms 36 each having a lifting member 37 at the end thereof, the arms 36 and the lifting members 37 being arranged to have a first motion inward beneath the bottom of the last previous article 27 delivered to the conveyor 30 and then to have a motion to lift such article and some of those outby thereof, so that the mailing piece delivered by the conveyor chains 16, 16 can have unimpeded movement therebeneath.

The movement of such arms is timed with the movement of the conveyor 30, and there is accordingly provided a sprocket chain 38 driven in synchronism with the conveyor 30, the sprocket chain being reeved about a driven sprocket 39 fast upon a shaft 41, see also Fig. 2, extending laterally of the conveyor 30 and journaled in bracket arms 42 depending from the frame portions 11 and 12.

A pair of three-dimensional cams 43 are mounted fast upon the shaft 41 and these are arranged to give the combined motion as previously described for the function described. Each of the cams 43 has a cam groove 44 therein which cooperates with a cam roller follower 46 mounted upon the arm 36, said arm being mounted on a ball joint 47 and a ball member 48 extending from the side frames 11 and 12. A spring 49 anchored at 51 to the arm 36 and at its other end to an arm 52 extending from the bracket 42 constrains the cam follower roller 46 and the arm 36 to follow the contour of a camming surface 53, whereby the arm may be raised and lowered, while at the same time having the aforesaid movement inward beneath the last such mailing piece delivered, then to raise the same, and then to be withdrawn after a new mailing piece has been delivered to the conveyor.

While the invention has been described in terms of a preferred embodiment thereof its scope is intended to be limited only by the claims here appended.

I claim as my invention:

1. In a conveying mechanism a first conveyor for moving flat articles such as a magazine or the like in spaced relationship, a second conveyor moving at a speed fractional of the speed of said first conveyor for moving said articles in underlying imbricating relationship, means for raising the trailing edges of the last articles delivered to said second conveyor to enable an article to be delivered by said first conveyor beneath the so lifted trailing edges of said last articles comprising a pair of arms having lifting members extending inward therefrom, said lifting members being movable inward and below the last delivered article and subsequently upward to raise the aforesaid trailing edge and thence outward and away from such lifted article, and a three dimensional cam driven by said second conveyor and cooperating with said arms for operating same.

2. In a conveying mechanism a first conveyor for moving flat articles such as a magazine or the like in spaced relationship, a second conveyor moving at a speed fractional of the speed of said first conveyor for moving said articles in underlying imbricating relationship, means for raising the trailing edges of the last articles delivered to said second conveyor to enable an article to be delivered by said first conveyor beneath the so lifted trailing edges of said last articles comprising a pair of arms having lifting members extending inward therefrom, said lifting members being movable inward and below the last delivered article and subsequently upward to raise the aforesaid trailing edge and thence outward and away from such lifted article, and a three dimensional cam cooperating with said arms for operating said arms.

3. In a conveying mechanism a first conveyor for moving flat articles such as a magazine or the like in spaced relationship, a second conveyor moving at a speed fractional of the speed of said first conveyor for moving said articles in underlying imbricating relationship, means for raising the trailing edges of the last articles delivered to said second conveyor to enable an article to be delivered by said first conveyor beneath the so lifted trailing edges of said last articles comprising a pair of arms having lifting members extending inward therefrom, and lifting members being movable inward and below the last delivered article and subsequently upward to raise the aforesaid trailing edge, and thence outward and away from such lifted article, and a cam cooperating with said arms for operating the same.

4. In a conveying mechanism a first conveyor for moving flat articles such as a magazine or the like in spaced relationship, a second conveyor moving at a speed fractional of the speed of said first conveyor for moving said articles in underlying imbricating relationship, means for raising the trailing edges of the last articles delivered to said second conveyor to enable an article to be delivered by said first conveyor beneath the so lifted trailing edges of said last articles comprising a pair of arms having lifting members extending inward therefrom, said lifting members being movable inward and below the last delivered article, and subsequently upward to raise the aforesaid trailing edge, and thence outward and away from such lifted article.

5. In a conveying mechanism a first conveyor for moving flat articles such as a magazine or the like in spaced relationship, a second conveyor moving at a speed fractional of the speed of said first conveyor for moving said articles in underlying imbricating relationship, means for raising the trailing edges of the last articles delivered to said second conveyor to enable an article to be delivered by said first conveyor beneath the so lifted trailing edges of said last articles comprising lifting means movable inward and below the last delivered article and subsequently upward to raise the aforesaid trailing edge and thence outward and away from such lifted article, and a three dimension cam driven by said second conveyor and cooperating with said lifting means for operating same.

6. In a conveying mechanism a first conveyor for moving flat articles such as a magazine or the like in spaced relationship, a second conveyor moving at a speed fractional of the speed of said first conveyor for moving said articles in underlying imbricating relationship, means for raising the trailing edges of the last articles delivered to said second conveyor to enable an article to be delivered by said first conveyor beneath the so lifted trailing edges of said last articles comprising lifting means movable laterally of the flat article and inward and below the last delivered article and subsequently upward to raise the aforesaid trailing edge and thence outward and away from such lifted article, and means driven by said second conveyor and cooperating with said lifting means for operating same.

7. In a conveying mechanism a first conveyor for moving flat articles such as a magazine or the like in spaced relationship, a second conveyor moving at a speed fractional of the speed of said first conveyor for moving said articles in underlying imbricating relationship, means for raising the trailing edges of the last articles delivered by said first conveyor beneath the so lifted trailing edges of said last articles comprising lifting means movable inward and below the last delivered article and subsequently upward to raise the aforesaid trailing edge, and thence outward and away from such lifted article, and cam means cooperating with said lifting means for operating same.

8. In a conveying mechanism, a first conveyor for moving flat articles such as a magazine or the like in spaced relationship, a second conveyor moving at a speed fractional of the speed of said first conveyor for moving said articles in underlying imbricating relationship, means for raising the trailing edges of the last articles delivered to said second conveyor to enable an article to be delivered by said first conveyor beneath the so lifted trailing edges of said last articles comprising lifting means movable laterally of the flat article and inward and below the last delivered article and subsequently upward to raise the aforesaid trailing edge and thence outward and away from such lifted article.

9. In a conveying mechanism, a first conveyor for moving flat articles such as a magazine or the like in spaced relationship, a second conveyor moving at a speed fractional of the speed of said first conveyor for moving said articles in underlying imbricating relationship, means for raising the trailing edges of the last articles delivered to said second conveyor to enable an article to be delivered by said first conveyor beneath the so lifted trailing edges of said last articles comprising lifting means movable laterally of the direction of movement of said articles and in a plane beneath the articles while they are moving in underlying imbricating relationship, said means being subsequently movable to lift the aforesaid trailing edges and being thereafter movable laterally of the direction of movement of the articles in underlying imbricating relationship and away from the so lifted article.

10. In a conveying mechanism, a first conveyor for moving flat articles such as a magazine or the like in spaced relationship, a second conveyor moving at a speed fractional of the speed of said first conveyor for moving said articles in underlying imbricating relationship, means for raising the trailing edges of the last articles delivered to said second conveyor to enable an article to be delivered by said first conveyor beneath the so lifted trailing edges of said last articles comprising lifting means including arms having lifting members thereon movable laterally of the direction of movement of said articles and in a plane beneath the articles moving in underlying imbricating relationship, said arms and said lifting members being subsequently movable in a direction to lift the aforesaid trailing edges and being thereafter movable laterally of the direction of movement of the articles in underlying imbricating relationship away from the so lifted articles.

References Cited in the file of this patent

UNITED STATES PATENTS

| | | |
|---|---|---|
| 1,656,289 | Novick | Jan. 17, 1928 |
| 2,748,917 | Rawe | June 5, 1956 |

FOREIGN PATENTS

| | | |
|---|---|---|
| 870,639 | Germany | Mar. 16, 1953 |